US012008217B2

(12) United States Patent
Zhai et al.

(10) Patent No.: US 12,008,217 B2
(45) Date of Patent: Jun. 11, 2024

(54) METHOD AND APPARATUS FOR DISPLAYING EMOJI REPLY, TERMINAL DEVICE, AND SERVER

(71) Applicants: TIANJIN BYTEDANCE TECHNOLOGY CO., LTD., Tianjin (CN); BEIJING ZITIAO NETWORK TECHNOLOGY CO., LTD., Beijing (CN)

(72) Inventors: Tao Zhai, Beijing (CN); Jie Yu, Beijing (CN); Zhiqin Li, Beijing (CN); Ran Yan, Beijing (CN); Eryou Hao, Beijing (CN)

(73) Assignees: TIANJIN BYTEDANCE TECHNOLOGY CO., LTD. (CN); BEIJING ZITIAO NETWORK TECHNOLOGY CO., LTD. (CN)

( * ) Notice: Subject to any disclaimer, the term of this patent is extended or adjusted under 35 U.S.C. 154(b) by 170 days.

(21) Appl. No.: 17/581,723

(22) Filed: Jan. 21, 2022

(65) Prior Publication Data

US 2022/0147206 A1 May 12, 2022

Related U.S. Application Data

(63) Continuation-in-part of application No. 17/243,181, filed on Apr. 28, 2021, now Pat. No. 11,258,745, (Continued)

(30) Foreign Application Priority Data

Feb. 1, 2019 (CN) .......................... 201910102967.3
Apr. 29, 2021 (CN) .......................... 202110478159.4

(51) Int. Cl.
*G06F 3/048* (2013.01)
*G06F 3/04817* (2022.01)
(Continued)

(52) U.S. Cl.
CPC ........ *G06F 3/0484* (2013.01); *G06F 3/04817* (2013.01); *G06F 3/0482* (2013.01); *H04L 51/42* (2022.05)

(58) Field of Classification Search
None
See application file for complete search history.

(56) References Cited

U.S. PATENT DOCUMENTS

2007/0247979 A1* 10/2007 Brillon ................ G11B 19/025
369/30.06
2010/0123724 A1 5/2010 Moore et al.
(Continued)

FOREIGN PATENT DOCUMENTS

CN 103269303 A 8/2013
CN 103269305 A 8/2013
(Continued)

OTHER PUBLICATIONS

First Office Action dated Feb. 11, 2022 in Chinese Patent Application No. 202110478159.4 (9 pages) with an English translation (5 pages).

(Continued)

*Primary Examiner* — Tuan S Nguyen

(57) ABSTRACT

The present disclosure provides a method and an apparatus for displaying an emoji reply, a terminal device, and a server. The method includes: popping up an emoji box quickly in response to an operation performed by a user on a target chat message on a chat interface to pop up the emoji box, sending an emoji selected by the user from the emoji box to a server directly as an emoji reply; and displaying the emoji entered by the user and a user label on the target chat message in accordance with instruction information returned by the server.

19 Claims, 10 Drawing Sheets

Related U.S. Application Data which is a continuation of application No. PCT/CN2020/073541, filed on Jan. 21, 2020.

(51) Int. Cl.
*G06F 3/0482* (2013.01)
*G06F 3/0484* (2022.01)
*H04L 51/42* (2022.01)

(56) References Cited

U.S. PATENT DOCUMENTS

| | | | |
|---|---|---|---|
| 2013/0275138 | A1 | 10/2013 | Gruber et al. |
| 2016/0364368 | A1 | 12/2016 | Chen et al. |
| 2017/0331769 | A1 | 11/2017 | Curry et al. |
| 2017/0336926 | A1* | 11/2017 | Chaudhri ............ H04L 51/18 |
| 2017/0336928 | A1 | 11/2017 | Chaudhri et al. |
| 2018/0082313 | A1 | 3/2018 | Duggin et al. |
| 2018/0255007 | A1 | 9/2018 | Ji et al. |
| 2020/0204513 | A1 | 6/2020 | Li |

FOREIGN PATENT DOCUMENTS

| | | | |
|---|---|---|---|
| CN | 103747138 | A | 4/2014 |
| CN | 104734940 | A | 6/2015 |
| CN | 105376148 | A | 3/2016 |
| CN | 105553834 | A | 5/2016 |
| CN | 106375178 | A | 2/2017 |
| CN | 106789596 | A | 5/2017 |
| CN | 108241464 | A | 7/2018 |
| CN | 304717156 | S | 7/2018 |
| CN | 108377216 | A | 8/2018 |
| CN | 109117068 | A | 1/2019 |
| CN | 109871165 | A | 6/2019 |
| CN | 110069620 | A | 7/2019 |
| CN | 110389809 | A | 10/2019 |
| CN | 111325004 | A | 6/2020 |
| CN | 112256180 | A | 1/2021 |
| CN | 112311661 | A | 2/2021 |
| CN | 106375178 | B | 6/2021 |
| EP | 2942910 | A1 | 11/2015 |
| JP | 201951483 | A | 5/2019 |
| WO | 2017/125051 | A1 | 7/2017 |

OTHER PUBLICATIONS

Added a Function to reply with "reaction" of emoji and @ to Facebook Messenger, D1 from First Office Action issued Feb. 11, 2022 in Chinese Patent Application No. 202110478159.4 with English translation.
9-3 Add a reaction to a message, D3 from First Office Action dated Feb. 11, 2022 in Chinese Patent Application No. 202110478159.4 with English translation.
New Features of Sierra 8, D4 from First Office Action dated Feb. 11, 2022 in Chinese Patent Application No. 202110478159.4 with English translation.
Notice of Reasons for Refusal dated Apr. 5, 2022 in Japanese Patent Application No. 2021-542256 (4 pages) with English translation (4 pages).
Notification to Grant Patent Right for Invention dated Jan. 14, 2022 in Chinese Patent Application No. 201910102967.3 (1 page) with an English translation (2 pages).
International Search Report for International Patent Application No. PCT/CN2020/073541, dated Apr. 26, 2020, 6 pages with English Translation.
Chinese Patent Application No. 201910102967.3, First Office Action and First Search Report dated May 19, 2020, 21 pages with English Translation.
Chinese Patent Application No. 201910102967.3, Second Office Action and Supplemental Search Report dated Nov. 18, 2020, 14 pages with English Translation.
Chinese Patent Application No. 201910102967.3, Third Office Action dated Feb. 3, 2021, 22 pages with English Translation.
Chinese Patent Application No. 201910102967.3, Fourth Office Action dated May 8, 2021, 25 pages with English Translation.
Chinese Patent Application No. 201910102967.3, Rejection Decision dated Aug. 4, 2021, 8 pages with English Translation.
Chinese Patent Application No. 201910102967.3, Reexamination Decision dated Nov. 24, 2021, 2 pages with English Translation.
Extended European Search Report dated Sep. 22, 2022 in European Patent Application No. 20749139.0 (11 bages).
Second Office Action dated Jul. 15, 2022 in Chinese Patent Application No. 202110478159.4, with English translation (18 pages).
Decision of Refusal dated Nov. 1, 2022 in JP 2021-542256, English translation (12 pages).
Notice of Decision of Granting Patent Right dated Nov. 16, 2022 in CN Application 202110478159.4, English translation (6 pages).
Office Action dated Jul. 14, 2023 in EP Application No. 20749139.0 (4 pages).
Office Action dated Jul. 17, 2023 in SG Application No. 11202103237U (10 pages).

* cited by examiner

METHOD AND APPARATUS FOR DISPLAYING EMOJI REPLY, TERMINAL DEVICE, AND SERVER

CROSS-REFERENCE TO RELATED APPLICATION

The present application is a Continuation-In-Part (CIP) of U.S. application Ser. No. 17/243,181, filed on Apr. 28, 2021, which is a continuation of International Application No. PCT/CN2020/073541, filed on Jan. 21, 2020, which claims priority to Chinese Patent Application No. 201910102967.3. The present application further claims priority to Chinese Patent Application No 202110478159.4 filed on Apr. 29, 2021. The entirety of the above-mentioned patent applications is hereby incorporated by reference herein and made a part of this specification.

TECHNICAL FIELD

The present disclosure relates to the field of terminal device technologies, and more particularly, to a method and apparatus for displaying an emoji reply, a terminal device, and a server.

BACKGROUND

Currently, while using an instant messaging tool in a terminal device for communication, a user can reply to a chat message on a chat interface as desired.

When the user replies to the chat message with emoji, the user may click an emoji button to invoke an emoji box, and select a corresponding emoji from the emoji box, such that the corresponding emoji will be entered in an input box. Then, the user can click "Send" to send the emoji. Accordingly, emoji reply information entered by the user is displayed on the chat interface. Here, the reply information includes a user label of the user and the emoji entered by the user.

However, with the above method for replying to the chat message with the emoji, when the user replies with the emoji, quite a few user operations are required. Moreover, when there are a number of chat messages on the chat interface, and one emoji reply message entered by the user is directly displayed on the chat interface, it is not clear which of the chat messages the user is replying to, resulting in a low signal-to-noise ratio in the conversation, especially when the chat interface is a chat interface corresponding to a group.

SUMMARY

The present disclosure provides a method and apparatus for displaying an emoji reply, a terminal device, and a server, capable of reducing operations required for a user to reply to a target chat message with an emoji, making it more convenient for the user to reply to the target chat message with the emoji. Moreover, the emoji entered by the user can be displayed directly on the target chat message, so as to clearly indicate on the chat interface that the emoji is the user's reply to the target chat message. It is thus clearer which target chat message the displayed emoji is intended for, such that the signal-to-noise ratio in the conversation can be improved.

According to an embodiment in a first aspect of the present disclosure, a method for displaying an emoji reply is provided. The method includes: popping up an emoji box on a chat interface upon detecting a first predetermined operation performed by a first participating user on a target chat message on the chat interface, the emoji box including a set of emoji; receiving a first emoji selected by the first participating user from the set of emoji, and sending an emoji reply request to a server; receiving first instruction information returned by the server in response to the emoji reply request; and displaying first emoji reply information on the target chat message in accordance with the first instruction information. The first emoji reply information includes the first emoji and a first user label corresponding to the first participating user.

In an embodiment of the present disclosure, the method may further include: sending an emoji reply withdrawal request to the server upon detecting an operation performed by the first participating user on the target chat message to withdraw the first emoji reply; receiving second instruction information returned by the server in response to the withdrawal request; and deleting the first user label, or the first user label and the first emoji, on the target chat message in accordance with the second instruction information.

In an embodiment of the present disclosure, the method may further include: receiving third instruction information from the server for instructing to display second emoji reply information on the target chat message, the second emoji reply information including a second emoji and a second user label corresponding to a second participating user; and displaying the second emoji reply information on the target chat message in accordance with the third instruction information.

In an embodiment of the present disclosure, the method may further include, when the target chat message is a chat message sent by the first participating user: receiving a new message notification sent by the server; prompting the first participating user to view the second emoji reply information in accordance with the new message notification.

In an embodiment of the present disclosure, the method may further include, prior to displaying the second emoji reply information on the target chat message in accordance with the third instruction information: determining whether the first emoji and the second emoji are consistent with each other or not. The operation of displaying the second emoji reply information on the target chat message in accordance with the third instruction information may be performed when the first emoji and the second emoji are consistent with each other.

In an embodiment of the present disclosure, the method may further include, when the first emoji and the second emoji are not consistent with each other: combining the first emoji reply information and the second emoji reply information, and displaying the combined information on the target chat message, the combined information including the first emoji, the first user label, and the second user label.

In an embodiment of the present disclosure, the method may further include: hiding the first user label on the target chat message and displaying prompt information on the target chat message, upon detecting that a number of users replying with the first emoji exceeds a predetermined threshold.

In an embodiment of the present disclosure, the method may further include: displaying the hidden first user label on the chat interface upon detecting a second predetermined operation performed by the first participating user on the prompt information.

With the method for displaying an emoji reply according to the embodiment of the present disclosure, an emoji box is popped up quickly in response to an operation performed by a user on a target chat message on a chat interface to pop up the emoji box, and an emoji selected by the user from the emoji box is sent to a server directly as an emoji reply. The emoji entered by the user and a user label are displayed on the target chat message in accordance with instruction information returned by the server. In this way, the operations required for the user to reply to the target chat message with the emoji can be reduced, making it more convenient for the user to reply to the target chat message with the emoji. Moreover, the emoji entered by the user can be displayed directly on the target chat message, so as to clearly indicate on the chat interface that the emoji is the user's reply to the target chat message. It is thus clearer which target chat message the displayed emoji is intended for, such that the signal-to-noise ratio in the conversation can be improved.

In order to achieve the above object, according to an embodiment in a second aspect of the present disclosure, a method of displaying an emoji reply is provided. The method includes: receiving an emoji reply request from a terminal device, the emoji reply request being triggered and transmitted by the terminal device when receiving a first emoji selected by a first participating user from a set of emoji in an emoji box, the first emoji box being popped up when the first participating user performs a first predetermined operation on a target chat message on a chat interface; determining each participating user in a conversation to which the target chat message belongs based on the emoji reply request, and establishing a binding relationship among a user identifier of the first participating user, an emoji identifier of the first emoji, and a message identifier of the target chat message; and sending first instruction information to a terminal device corresponding to each participating user for instructing the corresponding terminal device to display first emoji reply information on the target chat message, the first emoji reply information including the first emoji and a first user label corresponding to the first participating user.

In an embodiment of the present disclosure, the method may further include: determining a third participating user sending the target chat message; and sending a new message notification to a terminal device corresponding to the third participating user, for instructing the terminal device to prompt the third participating user to view the first emoji reply information.

In an embodiment of the present disclosure, the method may further include: receiving an emoji reply withdrawal request from the terminal device, the withdrawal request being triggered by the terminal device when receiving an operation performed by the first participating user on the target chat message to withdraw the first emoji reply; releasing the binding relationship among the user identifier of the first participating user, the emoji identifier of the first emoji, and the message identifier of the target chat message in accordance with the withdrawal request; and sending second instruction information to the terminal device corresponding to each participating user, for instructing the corresponding terminal device to delete the first user label, or the first user label and the first emoji, on the target chat message.

With the method for displaying an emoji reply according to the embodiment of the present disclosure, upon receiving an emoji reply request from a terminal device of a first participating user, a server determines each participating user in a conversation to which a target chat message belongs based on the emoji reply request, and establishes a binding relationship among a user identifier of the first participating user, an emoji identifier of the first emoji, and a message identifier of the target chat message. The server sends first instruction information to a terminal device corresponding to each participating user, such that first emoji reply information can be displayed on the target chat message on a chat interface for each participating user participating in the conversation. In this way, by transmitting only the instruction information to the terminal device of each participating user participating in the conversation, instead of transmitting a message notification to each participating user directly, disturbance to the participating users can be avoided. Moreover, the emoji reply information can be displayed on the target chat message on the chat interface for each participating user, making it more convenient for each participating user to view the emoji reply to the target chat message on the chat interface when he/she wants to view the emoji reply message.

In order to achieve the above object, according to an embodiment in a third aspect of the present disclosure, an apparatus for displaying an emoji reply is provided. The apparatus includes: an emoji providing module configured to pop up an emoji box on a chat interface upon detecting a first predetermined operation performed by a first participating user on a target chat message on the chat interface, the emoji box including a set of emoji; an emoji reply processing module configured to receive a first emoji selected by the first participating user from the set of emoji, and send an emoji reply request to a server; a first receiving module configured to receive first instruction information returned by the server in response to the emoji reply request; and an emoji reply displaying module configured to display first emoji reply information on the target chat message in accordance with the first instruction information. The first emoji reply information includes the first emoji and a first user label corresponding to the first participating user.

With the apparatus for displaying an emoji reply according to the embodiment of the present disclosure, an emoji box is popped up quickly in response to an operation performed by a user on a target chat message on a chat interface to pop up the emoji box, and an emoji selected by the user from the emoji box is sent to a server directly as an emoji reply. The emoji entered by the user and a user label are displayed on the target chat message in accordance with instruction information returned by the server. In this way, the operations required for the user to reply to the target chat message with the emoji can be reduced, making it more convenient for the user to reply to the target chat message with the emoji. Moreover, the emoji entered by the user can be displayed directly on the target chat message, so as to clearly indicate on the chat interface that the emoji is the user's reply to the target chat message. It is thus clearer which target chat message the displayed emoji is intended for, such that the signal-to-noise ratio in the conversation can be improved.

In order to achieve the above object, according to an embodiment in a fourth aspect of the present disclosure, an apparatus for displaying an emoji reply. The apparatus includes: a second receiving module configured to receive an emoji reply request from a terminal device, the emoji reply request being triggered and transmitted by the terminal device when receiving a first emoji selected by a first participating user from a set of emoji in an emoji box, the first emoji box being popped up when the first participating user performs a first predetermined operation on a target chat message on a chat interface; a processing module configured to determine each participating user in a conversation to which the target chat message belongs based on the emoji reply request, and establish a binding relationship among a user identifier of the first participating user, an emoji identifier of the first emoji, and a message identifier of the target chat message; and a sending module configured to send first instruction information to a terminal device corresponding to each participating user for instructing the corresponding terminal device to display first emoji reply information on the target chat message, the first emoji reply information including the first emoji and a first user label corresponding to the first participating user.

With the apparatus for displaying an emoji reply according to the embodiment of the present disclosure, when an emoji reply request is received from a terminal device of a first participating user, each participating user in a conversation to which a target chat message belongs is determined based on the emoji reply request, and a binding relationship among a user identifier of the first participating user, an emoji identifier of the first emoji, and a message identifier of the target chat message is established. First instruction information is sent to a terminal device corresponding to each participating user, such that first emoji reply information can be displayed on the target chat message on a chat interface for each participating user participating in the conversation. In this way, by transmitting only the instruction information to the terminal device of each participating user participating in the conversation, instead of transmitting a message notification to each participating user directly, disturbance to the participating users can be avoided. Moreover, the emoji reply information can be displayed on the target chat message on the chat interface for each participating user, making it more convenient for each participating user to view the emoji reply to the target chat message on the chat interface when he/she wants to view the emoji reply message.

In order to achieve the above object, according to an embodiment in a fifth aspect of the present disclosure, a terminal device is provided. The terminal device includes at least one processor and a memory communicatively connected to the at least one processor. The memory stores instructions executable by the at least one processor, and the instructions are configured to implement the method for displaying an emoji reply according to the embodiment in the first aspect of the present disclosure.

In order to achieve the above object, according to an embodiment in a sixth aspect of the present disclosure, a server is provided. The server includes at least one processor and a memory communicatively connected to the at least one processor. The memory stores instructions executable by the at least one processor, and the instructions are configured to perform the method for displaying an emoji reply according to the embodiment in the second aspect of the present disclosure.

In order to achieve the above object, according to an embodiment in a seventh aspect of the present disclosure, a computer readable storage medium is provided. The computer readable storage medium stores computer instructions configured to cause a computer to perform the method for displaying an emoji reply according to the embodiment in the first or second aspect of the present disclosure.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which.

DESCRIPTION OF EMBODIMENTS

Figure 1:
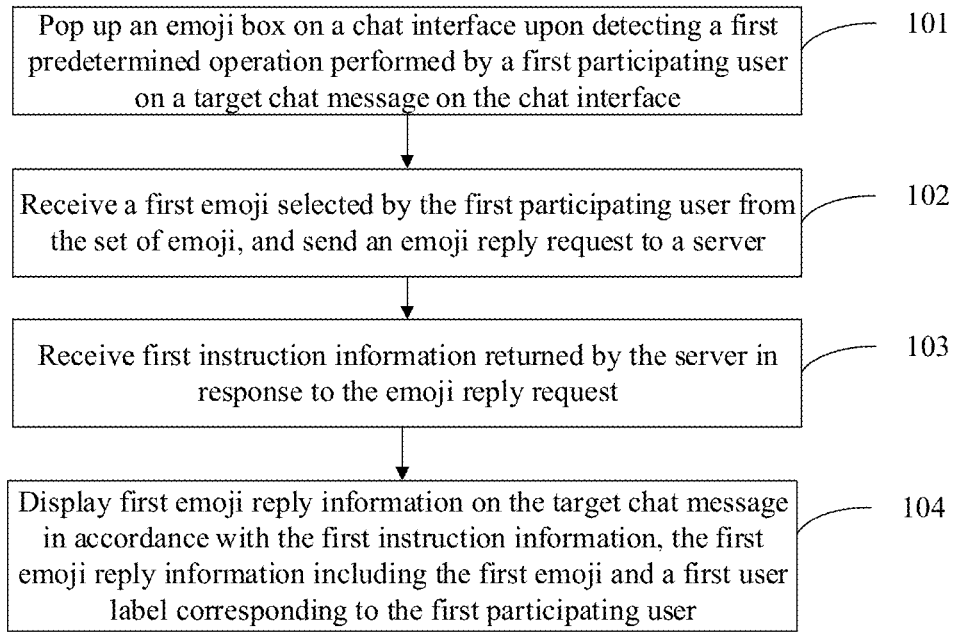
FIG. 1 is a flowchart illustrating a method for displaying an emoji reply according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A method and apparatus for displaying an emoji reply, a terminal device, and a server according to the embodiments of the present disclosure will be described below with reference to the figures.

It is to be noted here that the method for displaying an emoji reply can be applied on a terminal device side.

As shown in FIG. 1, the method for displaying an emoji reply includes the following steps.

At step 101, an emoji box is popped up on a chat interface when a first predetermined operation performed by a first participating user on a target chat message on the chat interface is detected.

Here, the emoji box includes a set of emoji.

Here, the set of emoji may include one or more emoji, and this embodiment is not limited thereto.

It is to be noted here that the emoji in the emoji box may be default emoji provided by a software service provider, or emoji uploaded and added by the user as desired, so as to meet the user's personalized need for setting the emoji in the emoji box.

Here, the first predetermined operation may be a predetermined operation for triggering the emoji box to be popped up. For example, the first predetermined operation may be long-pressing the target chat message, or moving a mouse onto the target chat message.

It is to be noted here that while some examples of the first predetermined operation have been given above, the first predetermined operation may alternatively be other operations that trigger the emoji box to be popped up, and this embodiment is not limited to any specific examples of the first predetermined operation.

As an exemplary implementation, in order to allow the user to perform other functional operations (such as copy, forward, etc.) on the target chat message, when the first predetermined operation performed by the first participating user on the target chat message on the chat interface is detected, a function button bar can be further displayed on the chat interface.

Here, the function button bar may include, but not limited to, function buttons such as copy, forward, favorite, multi-selection, and the like.

Here, the function button bar may be displayed at the bottom of the chat interface or any other position, and this embodiment is not limited thereto. It is to be noted that the first participating user can also perform other operations using the function buttons in the function button bar as desired, and this embodiment is not limited thereto.

At step 102, a first emoji selected by the first participating user from the set of emoji is received, and an emoji reply request is sent to a server.

In particular, the first emoji selected by the first participating user from the set of emoji is received, and a message identifier of the target chat message, an emoji identifier of the first emoji, and a user identifier of the first participating user can be sent to the server in the emoji reply request.

Correspondingly, up receiving the emoji reply request, the server can establish a binding relationship among the user identifier of the first participating user, the emoji identifier of the first emoji, and the message identifier of the target chat message, and determine each participating user in a conversion to which the target chat message belongs, and send first instruction information to a terminal device corresponding to each participating user.

Here, the first instruction information may instruct to display the first emoji reply information on the target chat message.

It is to be noted here that, in order to reduce disturbance caused by the emoji box to the user's chat, as an exemplary implementation, the emoji box on the chat interface can be retracted when the first emoji selected by the first participating user from the set of emoji is received. Therefore, it is possible to prevent the emoji box from always being displayed on chat interface which would otherwise cause disturbance to the user.

At step 103, first instruction information returned by the server in response to the emoji reply request is received.

At step 104, first emoji reply information is displayed on the target chat message in accordance with the first instruction information. The first emoji reply information includes the first emoji and a first user label corresponding to the first participating user.

The user label may be a user name of the first participating user or a user name of the first participating user in a group.

As an exemplary implementation, the first emoji reply information may be displayed in a bubble associated with the target chat message.

With the method for displaying an emoji reply according to the embodiment of the present disclosure, an emoji box is popped up quickly in response to an operation performed by a user on a target chat message on a chat interface to pop up the emoji box, and an emoji selected by the user from the emoji box is sent to a server directly as an emoji reply. The emoji entered by the user and a user label are displayed on the target chat message in accordance with instruction information returned by the server. In this way, the operations required for the user to reply to the target chat message with the emoji can be reduced, making it more convenient for the user to reply to the target chat message with the emoji. Moreover, the emoji entered by the user can be displayed directly on the target chat message, so as to clearly indicate on the chat interface that the emoji is the user's reply to the target chat message. It is thus clearer which target chat message the displayed emoji is intended for, such that the signal-to-noise ratio in the conversation can be improved.

Here, based on the above embodiment, in order to meet the user's personalized need for replying to one target chat message with a plurality of emoji, the first participating user can perform the first predetermined operation again on the target chat message on the chat interface, and select a second emoji different from the first emoji from the set of emoji in the popped emoji box. Correspondingly, further emoji reply information replied by the first participating user will be displayed on the target chat message on the chat interface, which includes the second emoji and a second user label corresponding to the first participating user. In this way, the personalized needs of the user for replying to one target chat message with a plurality of emoji can be met.

Based on the above embodiment, in order to meet the user's personalized need for withdrawing the replied emoji, the corresponding emoji can also be withdrawn according to the user's withdrawal operation, and a display effect on the conversation interface can be adjusted according to the user's withdrawal operation.

Figure 2:
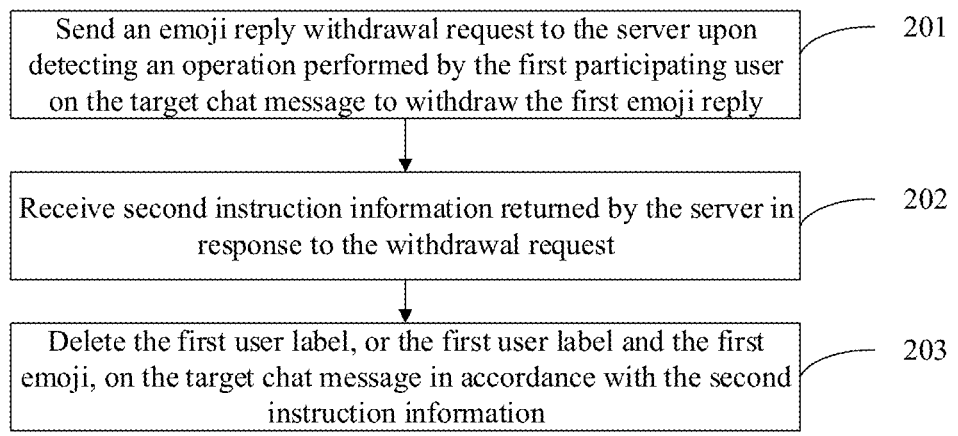
FIG. 2 is a flowchart illustrating a method for displaying an emoji reply according to another embodiment of the present disclosure.

FIG. 2 is a flowchart illustrating a method for displaying an emoji reply according to an embodiment of the disclosure.

Based on the embodiment shown in FIG. 1, the method may further include the following steps after step 104, as shown in FIG. 2.

At step 201, an emoji reply withdrawal request is sent to the server when an operation performed by the first participating user on the target chat message to withdraw the first emoji reply is detected.

Here, it can be appreciated that in different application scenarios, the user can perform the operation on the target chat message to withdraw the first emoji reply in various ways. Some examples will be given as follows.

As an example, when it is detected that the first participating user performs the first predetermined operation on the target chat message again, the emoji box is popped up again, and a second target emoji selected by the first participating user from the set of candidate emoji is received. When it is determined that the first target emoji is consistent with the second target emoji, it can be determined that the user performs an operation on the target chat message to withdraw the first emoji reply.

As another example, when it is detected that the first participating user clicks the first user label corresponding to the first emoji as displayed on the target chat message, or an area where the first user label is located, it can be determined that the user performs an operation on the target chat message to withdraw the first emoji reply.

In particular, when it is detected that the first participating user performs an operation on the target chat message to withdraw the first emoji reply, the message identifier of the target chat message, the emoji identifier of the first emoji, and the user identifier of the first participating user can be sent to the server in the emoji reply withdrawal request. Correspondingly, the server can release the binding relationship among the user identifier of the first participating user, the emoji identifier of the first emoji, and the message identifier of the target chat message in accordance with the emoji reply withdrawal request. When the first participating user is currently the only user who has replied with the first emoji, the server can send a second instruction message to the terminal device of each participating user in the conversation to which the target chat message belongs, for deleting the first emoji and the first user label on the target chat message.

In addition, when the server determines that there are other participating users who have replied with the first emoji, it can send a second instruction message to the terminal device of each participating user in the conversation to which the target chat message belongs, for deleting the first user label in the first emoji on the target chat message.

At step 202, second instruction information returned by the server in response to the withdrawal request is received.

Here, the second instruction information may instruct to delete the first user label, or the first user label and the first emoji.

At step 203, the first user label, or the first user label and the first emoji, on the target chat message is deleted in accordance with the second instruction information.

In this example, when the first participating user performs the operation on the target chat message to withdraw the first emoji reply, the first participating user's reply with the first emoji can be withdrawn, and the first user label, or the first user label and the first emoji, on the target chat message on the chat interface can be deleted. As a result, it is convenient for the user to withdraw the emoji reply to the target chat message, and the user's personalized need for withdrawing the emoji reply can be met.

Based on the above implementation, when there are a number of users participating in the conversation, that is, when the chat interface is a chat interface corresponding to a group, after a sending user sends the target chat message, each user participating in the conversation can reply to the target chat message with an emoji.

In the related art, after another participating user in the conversation replies to the target chat message with an emoji, the server sends a message notification to each participating user participating in the conversation. When the first participating user is not the sending user who sent the target chat message, the first participating user also receives a new message notification. An emoji reply message from the other participating user will be displayed on the chat interface of the first participating user, and the user will be prompted that the new message notification is received. In this way, many message notifications will be generated in the group chat interface, and each user will receive many message notifications. However, the message notifications actually only matter to the sending user of the target chat message, but not to most of the members who reply to the target chat message. Therefore, as an exemplary implementation, the server no longer sends a message notification to each participating user, but only sends instruction information instructing to display the second emoji reply information on the target chat message.

Here, the chat interface corresponding to the group may be a chat interface for a conversation having at least three participating users.

Figure 3:
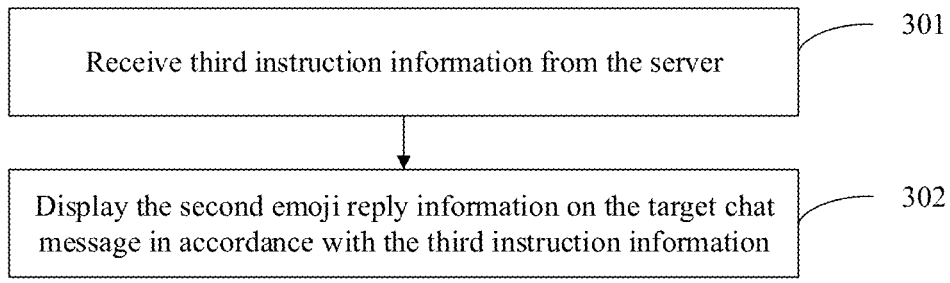
FIG. 3 is a flowchart illustrating a method for displaying an emoji reply according to yet another embodiment of the present disclosure.

Based on the embodiment shown in FIG. 1, the method may further include the following steps, as shown in FIG. 3.

At step 301, third instruction information is received from the server.

Here, the third instruction information is for instructing to display second emoji reply information on the target chat message. The second emoji reply information includes a second emoji and a second user label corresponding to a second participating user.

At step 302, the second emoji reply information is displayed on the target chat message in accordance with the third instruction information.

In this example, when the third instruction information is received from the server, the emoji reply information replied by the second participating user is displayed on the target chat message in accordance with the third instruction information, making it more convenient for a participating user to view the emoji reply information replied by other participating users according to the information displayed on the chat interface.

In an embodiment of the present disclosure, when the target chat message is a chat message sent by the first participating user, the method further includes: receiving a new message notification sent by the server; and prompting the first participating user to view the second emoji reply information in accordance with the new message notification.

In this example, the server can further determine the first participating user as the sender of the target chat message, and in addition to sending the second instruction information to the terminal device of the first participating user, the server can send a new message notification to the terminal device of the first participating user. Correspondingly, the terminal device of the first participating user can receive the new message notification, and prompt the first participating user to view the second emoji reply information in accordance with the new message notification. In this way, the new message notification is sent to the sending user of the target chat message to prompt the sending user to view the emoji reply information.

Here, the terminal device may prompt the first participating user in a way corresponding to the new message notification. For example, the new message notification can be displayed on a notification bar of the terminal device.

Here, the terminal device may use any existing scheme to notify the user of the new message notification, and details thereof will be omitted here.

An embodiment of the present disclosure provides another method for displaying an emoji reply, which relates to a further extension and optimization of the method shown in FIG. 3.

Figure 4:
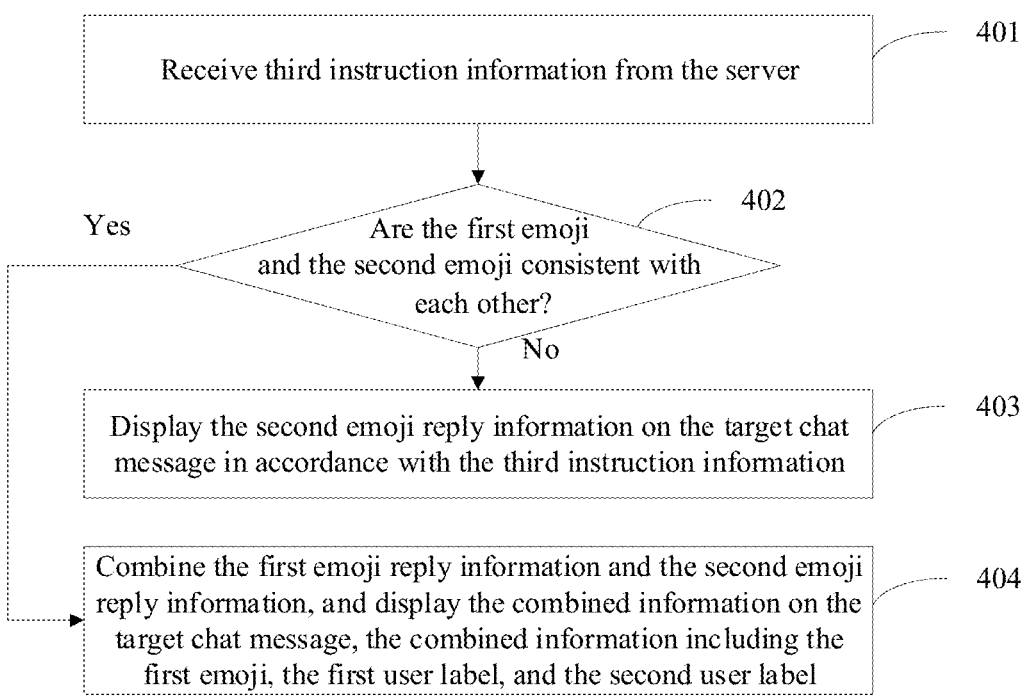
FIG. 4 is a flowchart illustrating a method for displaying an emoji reply according to still an embodiment of the present disclosure.

FIG. 4 is a flowchart illustrating a method for displaying an emoji reply according to another embodiment of the disclosure.

At step 401, third instruction information is received from the server.

Here, the third instruction information is for instructing to display second emoji reply information on the target chat message. The second emoji reply information includes a second emoji and a second user label corresponding to a second participating user.

At step 402, it is determined whether the first emoji and the second emoji are consistent with each other. If not, the method proceeds with step 403, or otherwise the method proceeds with step 404.

At step 403, the second emoji reply information is displayed on the target chat message in accordance with the third instruction information.

Figure 5:
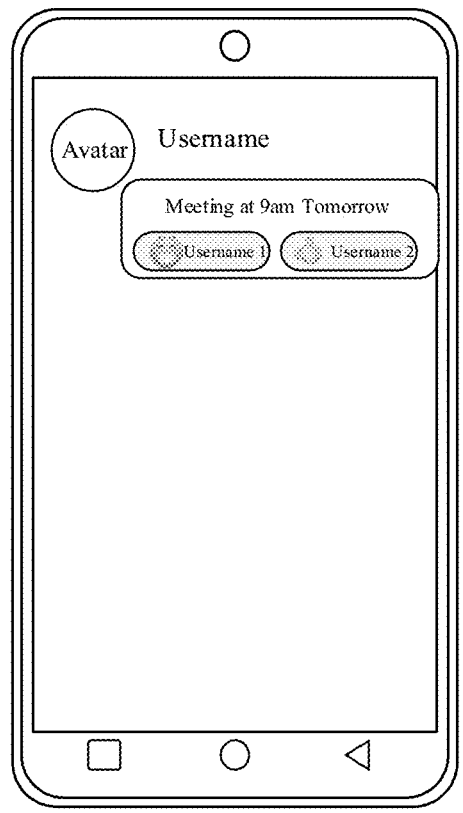
FIG. 5 is a first schematic diagram showing an example of a chat interface.

As an exemplary implementation manner, the first emoji reply information and the second emoji reply information may be displayed in a bubble associated with the target chat message. FIG. 5 is a schematic diagram showing an example of a chat interface including the first emoji reply information and the second emoji reply information. It is to be noted that in the example shown in FIG. 5, the first emoji is a "Like" emoji, the second emoji is a "Tooth" emoji, and the user label is a user name.

At step 404, the first emoji reply information and the second emoji reply information are combined, and the combined information is displayed on the target chat message. The combined information includes the first emoji, the first user label, and the second user label.

Figure 6:
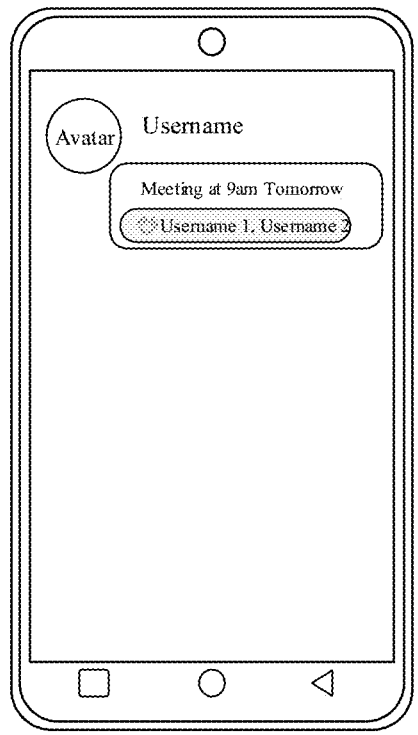
FIG. 6 is a second schematic diagram showing an example of a chat interface.

As an exemplary implementation, the first emoji, the first user label, and the second user label may be displayed in a bubble associated with the target chat message. FIG. 6 is a schematic diagram showing an example of a chat interface in this case. In the example shown in FIG. 6, the first emoji is an "ok" emoji, and the user label is a user name.

In this example, after the terminal device of the first participating user receives the third instruction information containing the second emoji, the terminal device can determine whether the first emoji and the second emoji are consistent with each other. If the first emoji and the second emoji are not consistent with each other, the second emoji and the second user label of the second participating user are displayed based on classification of emoji; or if the first emoji and the second emoji are consistent with each other, the emoji reply information with the same emoji is combined, and the combined information is displayed on the target chat message. In this way, the emoji reply information displayed on the target chat message can be managed such that the user can know the emoji replies to the target chat message more conveniently, which facilitates the user's awareness and view of the emoji replies by the participating users.

Based on any of the above embodiments, when there are a number of users participating in the conversation, after the sender sends the target chat message, each user participating in the conversation can reply to the target chat message with an emoji. When the number of users replying with the same emoji exceeds a predetermined threshold, the first user label may be hidden.

In particular, after receiving the first instruction information returned by the server in response to the emoji reply request, when it is detected that a number of users replying with the first emoji exceeds a first predetermined threshold, the first user label on the target chat message can be hidden, and prompt information can be displayed on the target chat message.

Here, the prompt information may indicate a number of hidden user labels.

Here, the first predetermined threshold may be a predetermined maximum number of user labels that can be displayed on a target chat message for one emoji.

Figure 7:
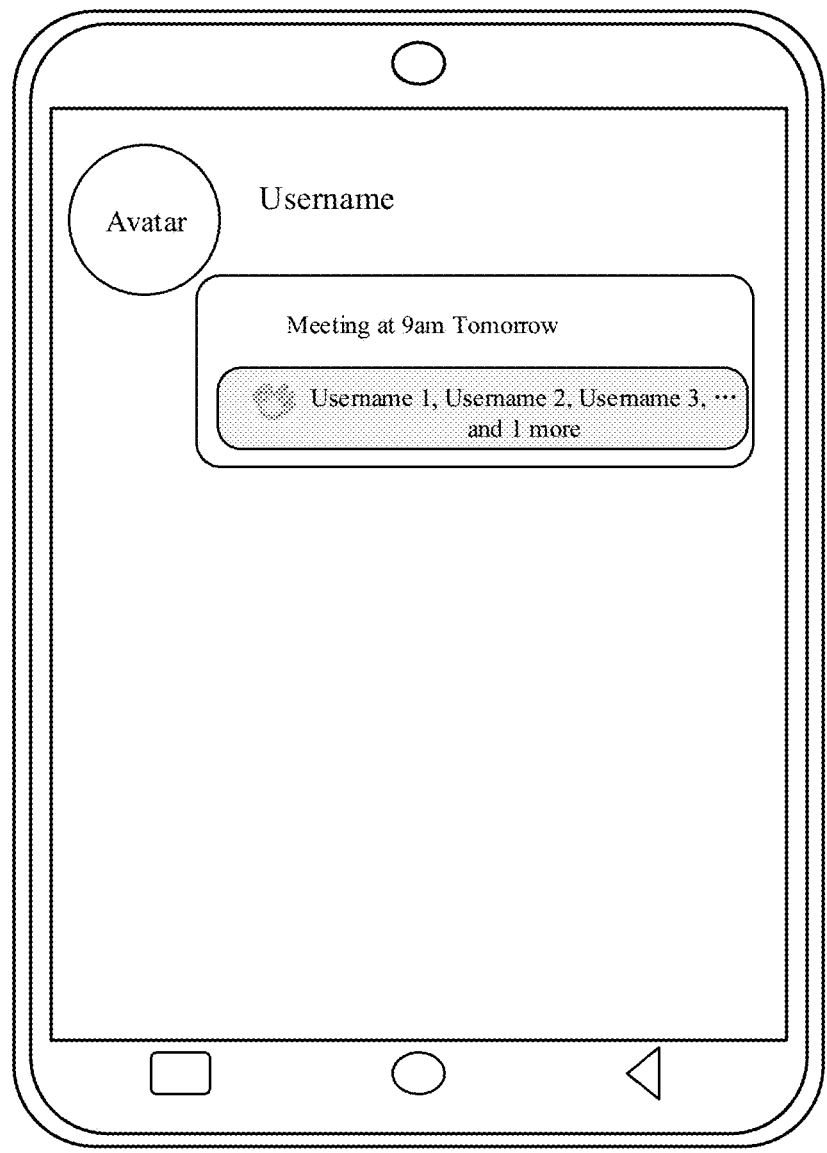
FIG. 7 is a third schematic diagram showing an example of a chat interface.

In an example, the first predetermined threshold may be 3, and it is assumed that there are three user labels being displayed for Emoji 1 on a bubble associated with a target chat message, namely Username 1, Username 2, and Username 3. When the first participating user replies to the target chat message with Emoji 1, displayed in a bubble associated with the target chat message on the chat interface may be Emoji 1, Username 1, Username 2, Username 3, and prompt information indicating one more user. FIG. 7 is a schematic diagram showing an example of a chat interface in a terminal device in this case. In the example shown in FIG. 7, Emoji 1 is an "ok" emoji.

Figure 8:
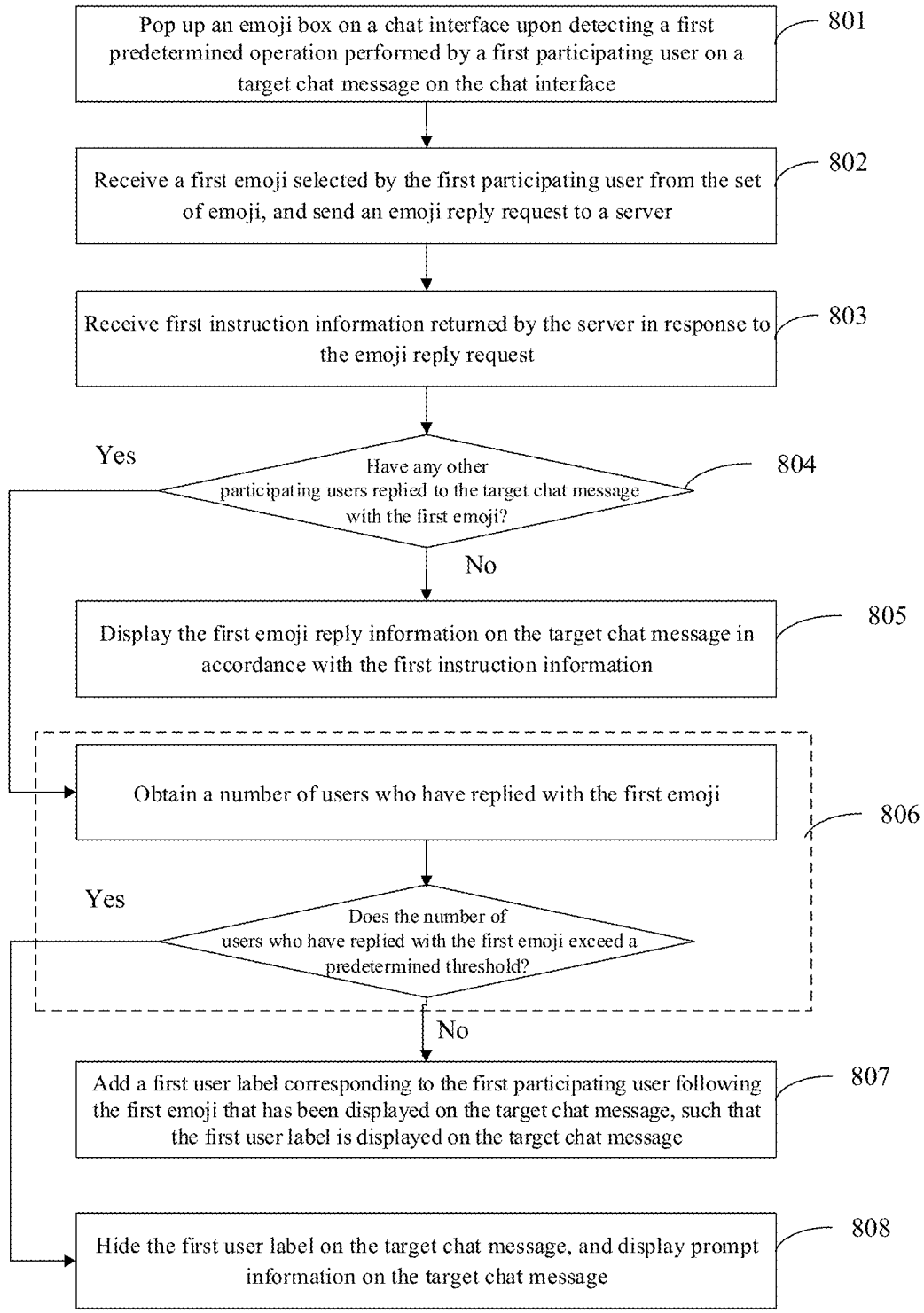
FIG. 8 is a flowchart illustrating a method for displaying an emoji reply according to still yet another embodiment of the present disclosure.

FIG. 8 is a flowchart illustrating a method for displaying an emoji reply according to another embodiment of the present disclosure, which relates to a further extension and optimization of the method shown in FIG. 1.

As shown in FIG. 8, the method includes the following steps.

At step 801, an emoji box is popped up on a chat interface when a first predetermined operation performed by a first participating user on a target chat message on the chat interface is detected.

Here, the emoji box includes a set of emoji.

At step 802, a first emoji selected by the first participating user from the set of emoji is received, and an emoji reply request is sent to a server.

At step 803, first instruction information returned by the server in response to the emoji reply request is received.

Here, the first instruction information may instruct to display first emoji reply information on the target chat message.

Here, the first emoji reply information may include a first emoji and a first user label corresponding to the first participating user.

At step 804, it is determined whether any other participating users have replied to the target chat message with the first emoji. If not, the method proceeds with step 805, or otherwise the method proceeds with step 806.

At step 805, the first emoji reply information is displayed on the target chat message in accordance with the first instruction information.

At step 806, a number of users who have replied with the first emoji is obtained, and it is determined whether the number of users who have replied with the first emoji exceeds a first predetermined threshold. If not, the method proceeds with step 807, or otherwise the method proceeds with step 808.

At step 807, a first user label corresponding to the first participating user is added following the first emoji that has been displayed on the target chat message, such that the first user label is displayed on the target chat message.

In an example, it is assumed that the first predetermined threshold is 3, and Username 1 corresponding to an emoji "ok" has been displayed in a bubble associated with a target chat message on a chat interface. After the first participating user replies to the target chat message with the emoji "ok" again, it can be determined that the number of users who have replied with the emoji "ok" is smaller than the first predetermined threshold. In this case, Username 2 corresponding to the first participating user can be added following the first emoji that has been displayed on the target chat message. FIG. 6 shows an example of a chat interface in a terminal device in this case.

At step 808, the first user label on the target chat message is hidden, and prompt information is displayed on the target chat message.

With the method for displaying an emoji reply according to the embodiment of the present disclosure, after detecting that a first participating user replies to a target chat message on a chat interface with a first emoji, a form in which emoji reply information corresponding to the first participating user is to be displayed on the target chat message can be determined based on a number of users who have replied with the first emoji. As a result, the emoji reply information displayed on the target chat message can be managed based on the number of users replying with the same emoji and displayed based on classification of emoji. In this way, the user can know the emoji replies to the target chat message more conveniently, which facilitates the user's awareness and view of the emoji replies by the participating users.

Based on the above embodiment, in order for the user to view the hidden user label, the hidden first user label can be displayed on the chat interface when a second predetermined operation performed by the first participating user on the first emoji reply information is detected. For example, the hidden first user label may be displayed on the chat interface upon detecting the second operation is performed by the user on the first emoji, the user label, the prompt information, or other part of the first emoji reply information.

In an embodiment, more than one emoji may be used to reply to the target chat message, and include, but not limited to, the first emoji and second emoji. For example, the first emoji reply information and second emoji reply information are displayed on the target chat message, and the second emoji reply information includes a second emoji selected by a second user for replying to the target chat message and a second user label corresponding to the second user. When a number of users who have replied to the target chat message with the second emoji exceeds a second predetermined threshold, the second emoji reply information further includes a user label for each of a number of users within the second predetermined threshold and second prompt information to represent one or more number of users that exceed the second predetermined threshold.

Figure 15:
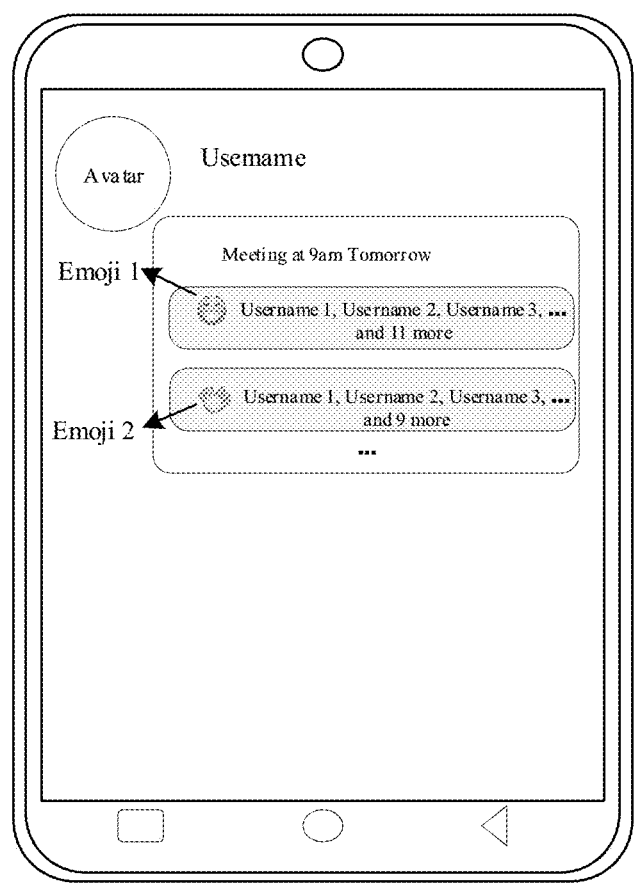
FIG. 15 is a schematic diagram showing an example of a chat interface in a terminal device.

FIG. 15 is a schematic diagram showing an example of a chat interface in a terminal device. In this example, the first predetermined threshold and the second predetermined threshold are both 3, and it is assumed that there are three user labels being displayed for Emoji 1/Emoji 2 on a bubble associated with a target chat message, namely Username 1, Username 2, and Username 3. When the first participating user replies to the target chat message with Emoji 1, displayed in a bubble associated with the target chat message on the chat interface may be Emoji 1, Username 1, Username 2, Username 3, and prompt information indicating 11 more users (i.e., the first emoji reply information) Similarly, when the first participating user replies to the target chat message with Emoji 2, displayed in a bubble associated with the target chat message on the chat interface may be Emoji 2, Username 1, Username 2, Username 3, and prompt information indicating 9 more users (i.e., the second emoji reply information). Although FIG. 15 illustrates the first and second emoji reply information, it should be noted that more or less emoji reply information may also be applicable according to the present disclosure.

In an example, when the second operation is performed by the user on the first prompt information, the first emoji, the number of users who have replied to the target chat message with the first emoji, and a user label for each of the number of users who have replied to the target chat message with the first emoji are displayed. For example, when the user clicks the first prompt information, a new interface may pop up, on which the first emoji, the number of users who have replied to the target chat message with the first emoji, and a user label for each of the number of users who have replied to the target chat message with the first emoji may be displayed.

Figure 16:
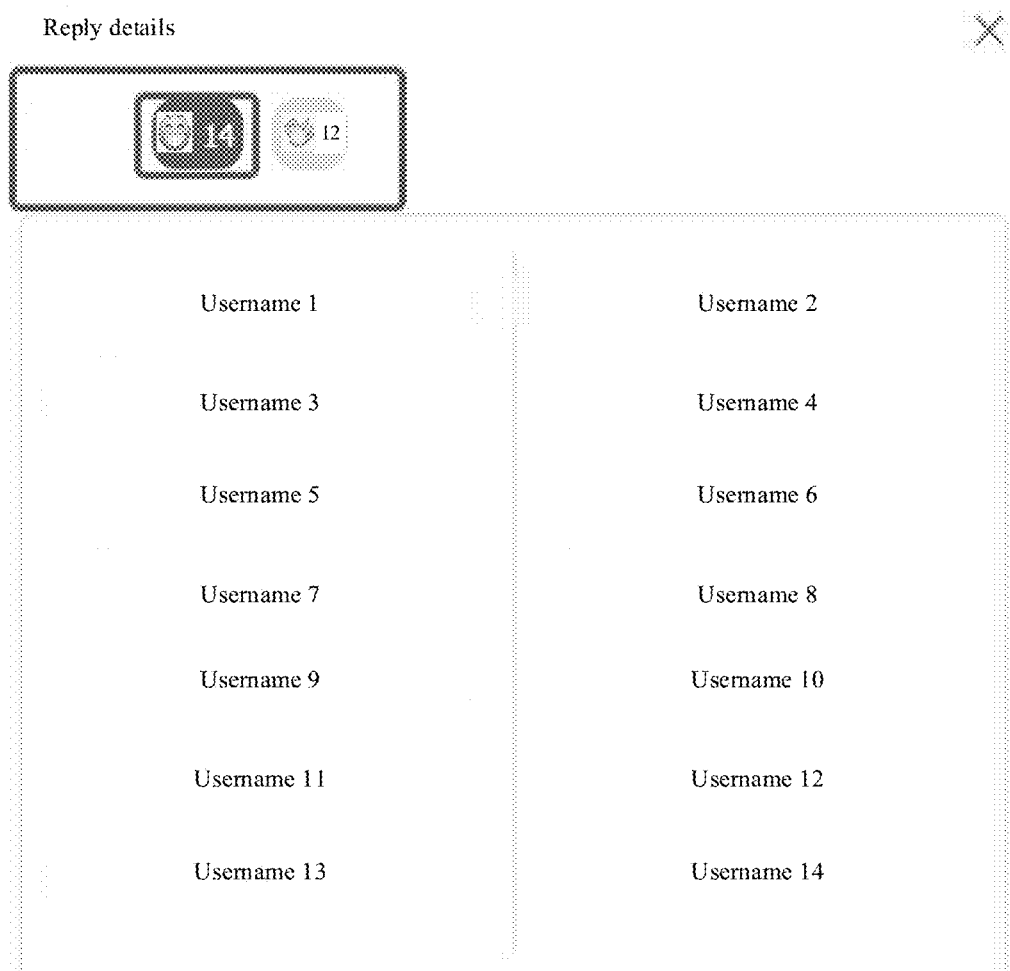
FIG. 16 is a schematic diagram showing an example of an interface in a terminal device.

In another example, when the second operation is performed by the user on the second prompt information, the first emoji, the number of users who have replied to the target chat message with the first emoji, the second emoji, the number of users who have replied to the target chat message with the second emoji, and a user label for each of the number of users who have replied to the target chat message with the second emoji are displayed. For example, when the user clicks the second prompt information, a new interface may pop up, on which the first emoji, the number of users who have replied to the target chat message with the first emoji, the second emoji, the number of users who have replied to the target chat message with the second emoji, and a user label for each of the number of users who have replied to the target chat message with the second emoji may be displayed. FIG. 16 is a schematic diagram showing an example of an interface in a terminal device. In this example, the chat interface of FIG. 16 is displayed when the second operation is performed by the user on the first emoji reply information, e.g., a clicking operation is performed by the user on any part of the first emoji reply information such as Emoji 1 as illustrated in FIG. 15. It should be noted that the example of FIG. 16 may be applicable to a situation in which the second operation is performed by the user on the second emoji reply information.

For example, when the user clicks the first emoji reply information as shown in FIG. 15, the interface of FIG. 16 is displayed. As shown in FIG. 16, each emoji as well as the number of users replying with the emoji are displayed, e.g., Emoji 1 followed by the number 14 (there are 14 users who have replied to the target chat message with Emoji 1) and Emoji 2 followed by the number 12 (there are 12 users who have replied to the target chat message with Emoji 2) are displayed together. Further, since the second operation is performed by the user on the first emoji reply information, i.e., Emoji 1 as well as the number 14 are selected, then user labels for the 14 users who have replied to the target chat message with Emoji 1 are also displayed on the interface of FIG. 16. In this case, the user may switch Emoji 1 to Emoji 2, and then user labels for the 12 users who have replied to the target chat message with Emoji 2 may be displayed on the interface of FIG. 16.

Here, the second predetermined operation may be a predetermined operation to display the hidden user label. For example, the second predetermined operation can be single-clicking, double-clicking, or long-pressing prompt information, and this embodiment is not limited to any specific form of the second predetermined operation.

In an embodiment, when at least one user has replied to the target chat message, a control for adding an emoji is displayed in a region where the target chat message is located.

In another embodiment, when at least one user has replied to the target chat message, displaying, in response to a cursor being in a region where the target chat message is located, a control in the region for adding an emoji.

Figure 17:
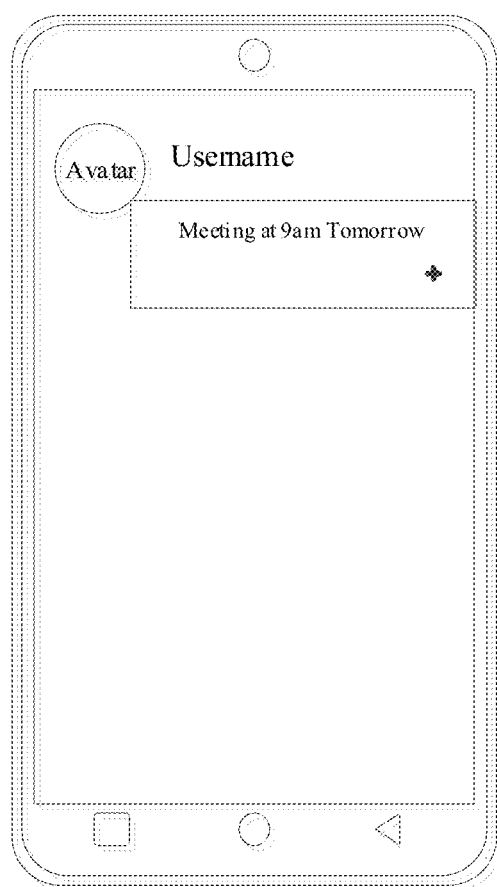
FIG. 17 is a schematic diagram showing an example of an interface in a terminal device.

FIG. 17 is a schematic diagram showing an example of an interface in a terminal device. As shown in FIG. 17, when a user has replied to the target chat message, a control for adding an emoji may be displayed where the target chat message is located, or the control may be displayed when it is detected that a cursor is in the region where the target chat message is located. Through the control, the user can select an emoji from a predetermined set of emoji.

Figure 9:
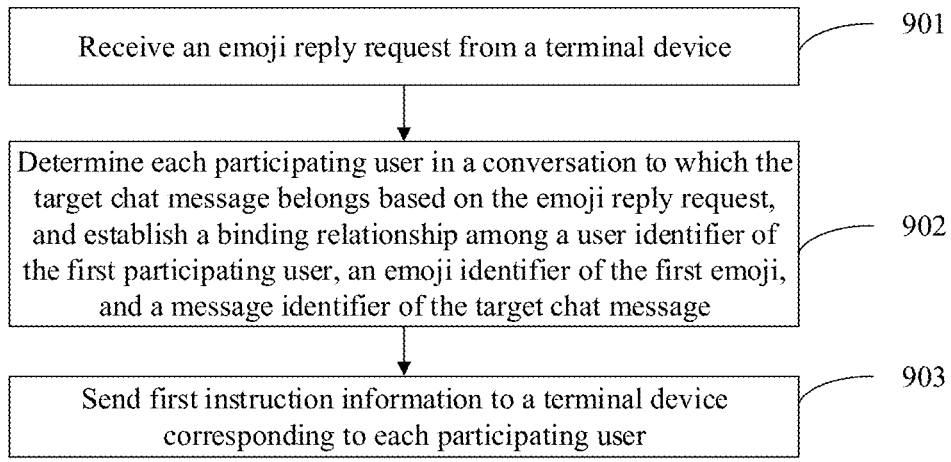
FIG. 9 is a flowchart illustrating a method for displaying an emoji reply according to an embodiment of the present disclosure.

FIG. 9 is a flowchart illustrating a method for displaying an emoji reply according to an embodiment of the disclosure.

It is to be noted here that the method for displaying the emoji reply can be applied on a server side.

As shown in FIG. 9, the method for displaying an emoji reply includes the following steps.

At step 901, an emoji reply request is received from a terminal device.

Here, the emoji reply request is triggered and transmitted by the terminal device when receiving a first emoji selected by a first participating user from a set of emoji in an emoji box. The first emoji box is popped up when the first participating user performs a first predetermined operation on a target chat message on a chat interface.

At step 902, each participating user in a conversation to which the target chat message belongs is determined based on the emoji reply request, and a binding relationship among a user identifier of the first participating user, an emoji identifier of the first emoji, and a message identifier of the target chat message is established.

At step 903, first instruction information is sent to a terminal device corresponding to each participating user.

Here, the first instruction information is for instructing the corresponding terminal device to display first emoji reply information on the target chat message. The first emoji reply information includes the first emoji and a first user label corresponding to the first participating user.

With the method for displaying an emoji reply according to the embodiment of the present disclosure, upon receiving an emoji reply request from a terminal device of a first participating user, a server determines each participating user in a conversation to which a target chat message belongs based on the emoji reply request, and establishes a binding relationship among a user identifier of the first participating user, an emoji identifier of the first emoji, and a message identifier of the target chat message. The server sends first instruction information to a terminal device corresponding to each participating user, such that first emoji reply information can be displayed on the target chat message on a chat interface for each participating user participating in the conversation. In this way, by transmitting only the instruction information to the terminal device of each participating user participating in the conversation, instead of transmitting a message notification to each participating user directly, disturbance to the participating users can be avoided. Moreover, the emoji reply information can be displayed on the target chat message on the chat interface for each participating user, making it more convenient for each participating user to view the emoji reply to the target chat message on the chat interface when he/she wants to view the emoji reply message.

Based on the above embodiment, in order to prompt a participating user sending the target chat message to view the emoji reply information, as an exemplary implementation, the method may further include: determining a third participating user sending the target chat message; and sending a new message notification to a terminal device corresponding to the third participating user, for instructing the terminal device to prompt the third participating user to view the first emoji reply information.

In another embodiment of the present disclosure, after determining each participating user in the conversation to which the target chat message belongs and establishing the binding relationship among the user identifier of the first participating user, the emoji identifier of the first emoji, and the message identifier of the target chat message, a sending user who sends the target message can be determined, the first instruction information can be sent to terminal devices of participating users other than the sending user, and a new message notification can be sent to the terminal device corresponding to the sending user.

The first instruction information is for instructing the corresponding terminal device to display the first emoji reply information on the target chat message.

Here, the new message notification is for instructing the corresponding terminal device to notify user of arrival of a new message and display the first emoji reply information on the target chat message.

Figure 10:
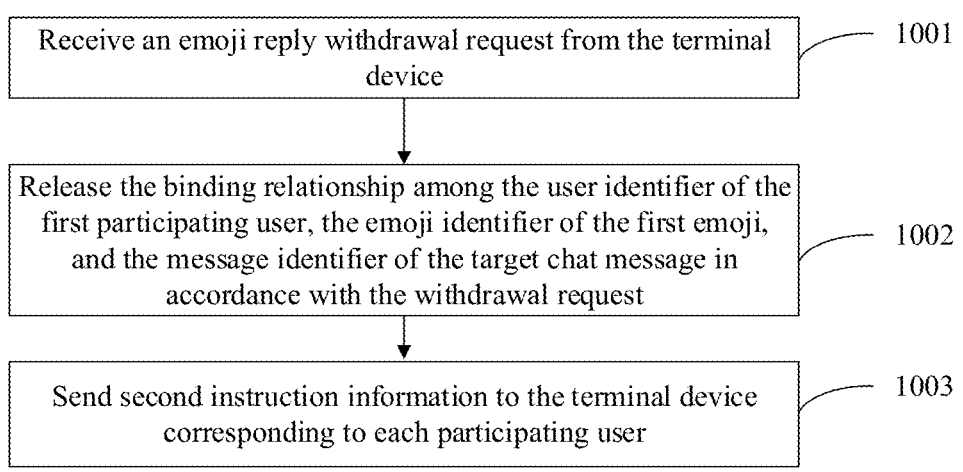
FIG. 10 is a flowchart illustrating a method for displaying an emoji reply according to another embodiment of the present disclosure.

Based on any of the above embodiments, the method may further include the following steps, as shown in FIG. 10.

At step 1001, an emoji reply withdrawal request is received from the terminal device.

The withdrawal request is triggered by the terminal device when receiving an operation performed by the first participating user on the target chat message to withdraw the first emoji reply.

At step 1002, the binding relationship among the user identifier of the first participating user, the emoji identifier of the first emoji, and the message identifier of the target chat message is released in accordance with the withdrawal request.

At step 1003, second instruction information is sent to the terminal device corresponding to each participating user.

The second instruction information is for instructing the corresponding terminal device to delete the first user label, or the first user label and the first emoji, on the target chat message With the method for displaying the emoji reply according to the embodiment of the present disclosure, when the first participating user performs the operation on the target chat message to withdraw the first emoji reply, the first participating user's reply with the first emoji can be withdrawn, and the first user label, or the first user label and the first emoji, on the target chat message on the chat interface can be deleted. As a result, it is convenient for the user to withdraw the emoji reply to the target chat message, and the user's personalized need for withdrawing the emoji reply can be met.

An embodiment of the present disclosure also provides an apparatus for displaying an emoji reply.

Figure 11:
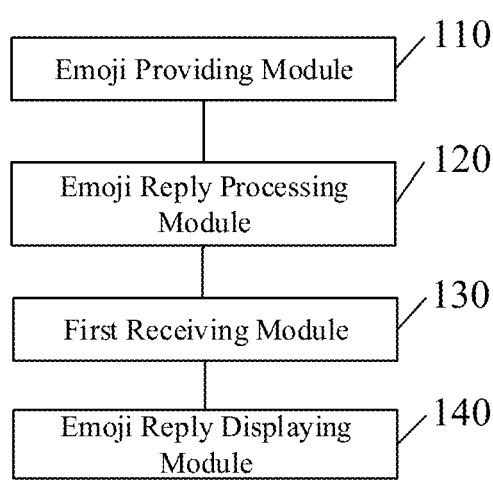
FIG. 11 is a block diagram showing a structure of an apparatus for displaying an emoji reply according to an embodiment of the present disclosure.

FIG. 11 is a block diagram showing a structure of an apparatus for displaying an emoji reply according to an embodiment of the present disclosure.

It is to be noted here that the apparatus for displaying an emoji reply may be provided in a terminal device.

As shown in FIG. 11, the apparatus for displaying an emoji reply may include an emoji providing module 110, an emoji reply processing module 120, a first receiving module 130, and an emoji reply displaying module 140.

The emoji providing module 110 is configured to pop up an emoji box on a chat interface upon detecting a first predetermined operation performed by a first participating user on a target chat message on the chat interface. The emoji box includes a set of emoji.

The emoji reply processing module 120 is configured to receive a first emoji selected by the first participating user from the set of emoji, and send an emoji reply request to a server.

The first receiving module 130 is configured to receive first instruction information returned by the server in response to the emoji reply request.

The emoji reply displaying module 140 is configured to display first emoji reply information on the target chat message in accordance with the first instruction information. The first emoji reply information includes the first emoji and a first user label corresponding to the first participating user.

It is to be noted that the above description of the embodiments of the method for displaying an emoji reply is also applicable to the apparatus for displaying an emoji reply according to this embodiment, and details thereof will be omitted here.

With the apparatus for displaying an emoji reply according to the embodiment of the present disclosure, an emoji box is popped up quickly in response to an operation performed by a user on a target chat message on a chat interface to pop up the emoji box, and an emoji selected by the user from the emoji box is sent to a server directly as an emoji reply. The emoji entered by the user and a user label are displayed on the target chat message in accordance with instruction information returned by the server. In this way, the operations required for the user to reply to the target chat message with the emoji can be reduced, making it more convenient for the user to reply to the target chat message with the emoji. Moreover, the emoji entered by the user can be displayed directly on the target chat message, so as to clearly indicate on the chat interface that the emoji is the user's reply to the target chat message. It is thus clearer which target chat message the displayed emoji is intended for, such that the signal-to-noise ratio in the conversation can be improved.

Based on the above embodiment, in order to meet the user's need to withdraw the first emoji that was previously replied, based on the above embodiment of the apparatus, the apparatus may also include an emoji withdrawing module (not shown) and a deleting module (not shown).

The emoji withdrawing module can be configured to send an emoji reply withdrawal request to the server upon detecting an operation performed by the first participating user on the target chat message to withdraw the first emoji reply.

The first receiving module 130 can be further configured to receive second instruction information returned by the server in response to the withdrawal request.

The deleting module can be configured to delete the first user label, or the first user label and the first emoji, on the target chat message in accordance with the second instruction information.

In an embodiment of the present disclosure, the above first receiving module 130 can be further configured to receive third instruction information from the server for instructing to display second emoji reply information on the target chat message. The second emoji reply information includes a second emoji and a second user label corresponding to a second participating user.

The emoji reply displaying module 140 can be further configured to display the second emoji reply information on the target chat message in accordance with the third instruction information.

In an embodiment of the present disclosure, when the target chat message is a chat message sent by the first participating user, the apparatus may further include a prompting module (not shown).

The first receiving module can be further configured to receive a new message notification sent by the server.

The prompting module can be configured to prompt the first participating user to view the second emoji reply information in accordance with the new message notification.

In an embodiment of the present disclosure, before displaying the second emoji reply information on the target chat message in accordance with the third instruction information, the apparatus may further include a determining module (not shown).

The determining module may be configured to determine whether the first emoji and the second emoji are consistent with each other or not.

The emoji reply displaying module can be further configured to display the second emoji reply information on the target chat message in accordance with the third instruction information when the first emoji and the second emoji are consistent with each other.

In an embodiment of the present disclosure, the apparatus may further include a combining processing module (not shown).

The combining processing module can be configured to combine the first emoji reply information and the second emoji reply information, and display the combined information on the target chat message. The combined information includes the first emoji, the first user label, and the second user label. In this way, the emoji reply information with the same emoji can be combined for displaying, making it more convenient for the user to view the users replying with the same emoji, thereby improving the viewing experience of the user.

In an embodiment of the present disclosure, the apparatus may further include a hiding processing module (not shown).

The hiding processing module can be configured to hide the first user label on the target chat message and display prompt information on the target chat message, upon detecting that a number of users replying with the first emoji exceeds a first predetermined threshold. In this way, when there are many users replying with the same emoji, some user labels can be hidden to further facilitate the user's viewing of the emoji replies.

In an embodiment of the present disclosure, in order to meet the user's personalized need for viewing the hidden user labels, the apparatus may further include a display processing module configured to display the hidden first user label on the chat interface upon detecting a second predetermined operation performed by the first participating user on the prompt information.

Figure 12:
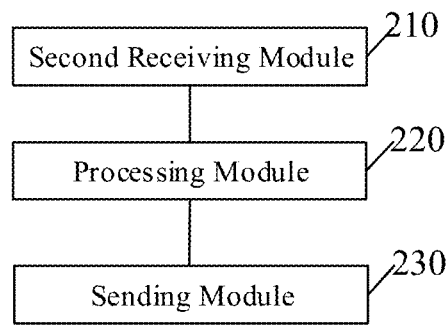
FIG. 12 is a block diagram showing a structure of an apparatus for displaying an emoji reply according to another embodiment of the present disclosure.

FIG. 12 is a block diagram showing a structure of an apparatus for displaying an emoji reply according to another embodiment of the present disclosure.

It is to be noted here that the apparatus for displaying an emoji reply may be provided in a server.

As shown in FIG. 12, the apparatus for displaying an emoji reply may include a second receiving module 210, a processing module 220, and a sending module 230.

The second receiving module 210 is configured to receive an emoji reply request from a terminal device. The emoji reply request is triggered and transmitted by the terminal device when receiving a first emoji selected by a first participating user from a set of emoji in an emoji box. The first emoji box is popped up when the first participating user performs a first predetermined operation on a target chat message on a chat interface.

The processing module 220 is configured to determine each participating user in a conversation to which the target chat message belongs based on the emoji reply request, and establish a binding relationship among a user identifier of the first participating user, an emoji identifier of the first emoji, and a message identifier of the target chat message.

The sending module 230 is configured to send first instruction information to a terminal device corresponding to each participating user for instructing the corresponding terminal device to display first emoji reply information on the target chat message. The first emoji reply information includes the first emoji and a first user label corresponding to the first participating user.

It is to be noted that the above description of the embodiments of the method for displaying an emoji reply is also applicable to the apparatus for displaying an emoji reply according to this embodiment, and details thereof will be omitted here.

With the apparatus for displaying an emoji reply according to the embodiment of the present disclosure, when an emoji reply request is received from a terminal device of a first participating user, each participating user in a conversation to which a target chat message belongs is determined based on the emoji reply request, and a binding relationship among a user identifier of the first participating user, an emoji identifier of the first emoji, and a message identifier of the target chat message is established. First instruction information is sent to a terminal device corresponding to each participating user, such that first emoji reply information can be displayed on the target chat message on a chat interface for each participating user participating in the conversation. In this way, by transmitting only the instruction information to the terminal device of each participating user participating in the conversation, instead of transmitting a message notification to each participating user directly, disturbance to the participating users can be avoided. Moreover, the emoji reply information can be displayed on the target chat message on the chat interface for each participating user, making it more convenient for each participating user to view the emoji reply to the target chat message on the chat interface when he/she wants to view the emoji reply message.

In order to implement the above embodiments, an embodiment of the present disclosure also provides a computer-readable storage medium having a computer program stored thereon. The program is executed by a processor for performing the method for displaying an emoji reply according to any of the above embodiments.

Figure 13:
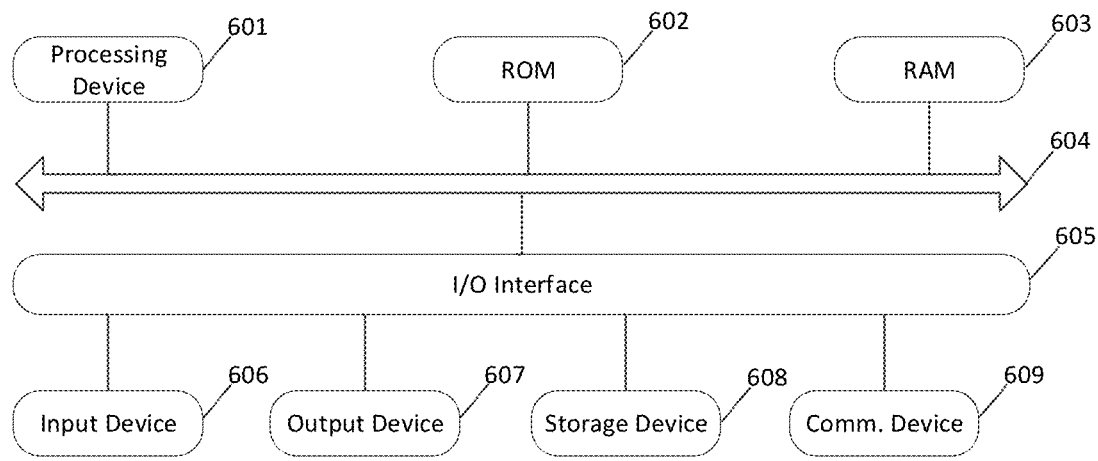
FIG. 13 is a block diagram showing a hardware structure of a terminal device for performing a method for displaying an emoji reply according to another embodiment of the present disclosure.

Reference is now made to FIG. 13, which is a schematic diagram showing a terminal device 600 adapted to implement the embodiments of the present disclosure. The terminal device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The terminal device illustrated in FIG. 13 is exemplary only, and should not be construed as limiting the function and scope of use of the embodiments of the present disclosure.

As illustrated in FIG. 13, the terminal device 600 may include a processing device (such as a central processing unit, a graphics processing unit, etc.) 601, which may perform various appropriate actions and processes in accordance with programs stored in a Read Only Memory (ROM) 602 or loaded from a storage device 608 into a Random Access Memory (RAM) 603. In the RAM 603, various programs and data required for operation of the terminal device 600 may also be stored. The processing device 601, the ROM 602, and the RAM 603 are connected to each other through a bus 604. An Input/Output (I/O) interface 605 is also connected to the bus 604.

Generally, the following devices may be connected to the I/O interface 605: an input device 606 including, for example, a touch screen, a touch pad, a keyboard, a mouse, a camera, a microphone, an accelerometer, a gyroscope, etc.; an output device 607 including, for example, a Liquid Crystal Display (LCD), a speaker, an oscillator, etc.; the storage device 608 including, for example, a magnetic tape or a hard disk; and a communication device 609. The communication device 609 may allow the terminal device 600 to perform wireless or wired communication with other devices for data exchange. Although FIG. 13 illustrates the terminal device 600 having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 609, or installed from the storage device 608, or installed from the ROM 602. When the computer program is executed by the processing device 601, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

The above computer-readable medium may be included in the above terminal device; or may be standalone without being assembled into the terminal device.

The above computer-readable medium may carry one or more programs which, when executed by the terminal device, cause the terminal device to: pop up an emoji box on a chat interface upon detecting a first predetermined operation performed by a first participating user on a target chat message on the chat interface, the emoji box including a set of emoji; receive a first emoji selected by the first participating user from the set of emoji, and send an emoji reply request to a server; receive first instruction information returned by the server in response to the emoji reply request; and display first emoji reply information on the target chat message in accordance with the first instruction information. The first emoji reply information includes the first emoji and a first user label corresponding to the first participating user.

Alternatively, the above computer-readable medium may carry one or more programs which, when executed by the terminal device, cause the terminal device to: pop up an emoji box on a chat interface upon detecting a first predetermined operation performed by a first participating user on a target chat message on the chat interface, the emoji box including a set of emoji; receive a first emoji selected by the first participating user from the set of emoji, and send an emoji reply request to a server; receive first instruction information returned by the server in response to the emoji reply request; and display first emoji reply information on the target chat message in accordance with the first instruction information. The first emoji reply information includes the first emoji and a first user label corresponding to the first participating user.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

Figure 14:
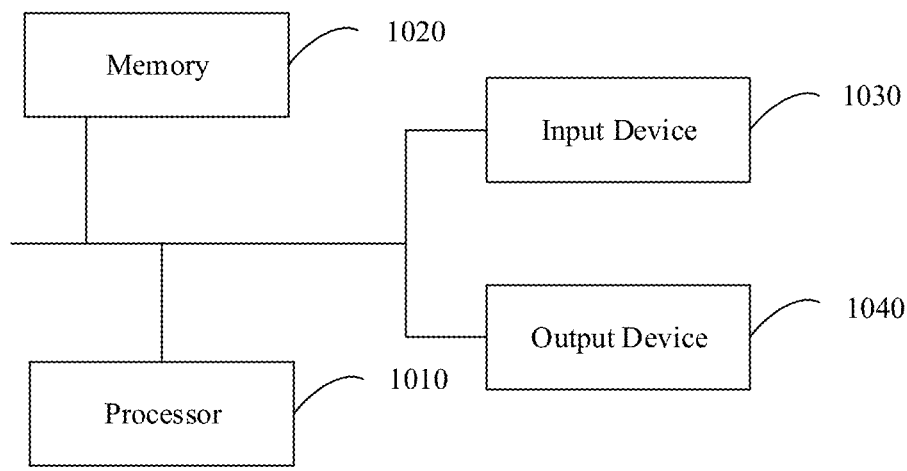
FIG. 14 is a block diagram showing a hardware structure of a server for performing a method for displaying an emoji reply according to another embodiment of the present disclosure.

FIG. 14 is a block diagram showing a hardware structure of a server for performing a method for displaying an emoji reply according to an embodiment of the present disclosure. As shown in FIG. 14, the server includes: one or more processors 1010 and a memory 1020. In FIG. 14, one processor 1010 is shown as an example.

The server may further include: an input device 1030 and an output device 1040.

The processor 1010, the memory 1020, the input device 1030, and the output device 1040 may be connected with each other via a bus or in any other way. In FIG. 14, a bus connection is shown as an example.

The memory 1020 stores instructions executable by the processor 1010, and the instructions are configured to implement the method for displaying an emoji reply in the embodiments according to the third aspect of the present disclosure.

In order to implement the above embodiments, the present disclosure also provides a computer-readable storage medium having a computer program stored thereon. The program, when executed by a processor, implements the method for displaying an emoji reply according to the above embodiments.

In the present disclosure, the description with reference to the terms "one embodiment", "some embodiments", "an example", "a specific example", or "some examples", etc., means that specific features, structures, materials, or characteristics described in conjunction with the embodiment(s) or example(s) are included in at least one embodiment or example of the present disclosure. In the present disclosure, any illustrative reference of the above terms does not necessarily refer to the same embodiment(s) or example(s). Moreover, the specific features, structures, materials or characteristics as described can be combined in any one or more embodiments or examples as appropriate. In addition, those skilled in the art can combine and integrate different embodiments or examples, or features thereof, as described in the present disclosure, provided that they do not contradict each other.

In addition, the terms "first" and "second" are only used for the purpose of description, and should not be construed as indicating or implying any relative importance or implicitly indicating the number of defined technical features. Therefore, the features defined with "first" and "second" may explicitly or implicitly include at least one of the features. In the description of the present disclosure, "a plurality of" means at least two, e.g., two, three, etc., unless specifically defined otherwise.

Any process or method described in the flowchart or described otherwise herein can be understood as a module, segment or part of codes that include one or more executable instructions for implementing steps of specific logical functions or processes. It can be appreciated by those skilled in the art that the scope of the preferred embodiments of the present disclosure includes additional implementations where functions may not be performed in the order as shown or discussed, including implementations where the involved functions are performed substantially in parallel or even in a reverse order.

The logics and/or steps represented in the flowchart or described otherwise herein can be for example considered as a list of ordered executable instructions for implementing logic functions, and can be embodied in any computer-readable medium that is to be used by or used with an instruction execution system, apparatus, or device (such as a computer-based system, a system including a processor, or any other system that can retrieve and execute instructions from an instruction execution system, apparatus, or device). For the present disclosure, a "computer-readable medium" can be any apparatus that can contain, store, communicate, propagate, or transmit a program to be used by or used with an instruction execution system, apparatus, or device. More specific examples of computer-readable mediums include, as a non-exhaustive list: an electrical connector (electronic device) with one or more wirings, a portable computer disk case (magnetic devices), a Random Access Memory (RAM), a Read Only Memory (ROM), an Erasable Programmable Read Only Memory (EPROM or flash memory), a fiber optic device, and a portable Compact Disk Read Only memory (CDROM). In addition, the computer-readable medium may even be paper or other suitable medium on which the program can be printed, as the program can be obtained electronically, e.g., by optically scanning the paper or the other medium, and then editing, interpreting, or otherwise processing the scanning result when necessary, and then stored in a computer memory.

It can be appreciated that each part of the present disclosure can be implemented in hardware, software, firmware or any combination thereof. In the above embodiments, a number of steps or methods can be implemented using software or firmware stored in a memory and executed by a suitable instruction execution system. For example, when implemented in hardware, as in another embodiment, it can be implemented by any one or combination of the following technologies known in the art: a discrete logic circuit having logic gate circuits for implementing logic functions on data signals, an application-specific integrated circuit with suitable combined logic gates, a Programmable Gate Array (PGA), a Field Programmable Gate Array (FPGA), etc.

It can be appreciated by those skilled in the art that all or part of the steps in the methods of the above embodiments can be implemented by relevant hardware following instructions of a program. The program can be stored in a computer-readable storage medium, and the program, when executed, implements any one or combination of the steps of the method embodiments.

In addition, the functional units in various embodiments of the present disclosure may be integrated into one processing module, or each unit may be standalone physically, or two or more units may be integrated into one module. The above integrated module can be implemented in a form of hardware or in a form of a software functional module. When implemented in the form of the software function module and sold or used as an Independent product, the integrated module can also be stored in a computer-readable storage medium.

The storage medium mentioned above may be a read only memory, a magnetic disk or an optical disc, etc. Although the embodiments of the present disclosure have been shown and described above, it can be appreciated that the above embodiments are exemplary only, and should not be construed as limiting the present disclosure. Various changes, modifications, replacements and variants can be made to the above embodiments by those skilled in the art without departing from the scope of the present disclosure.

What is claimed is:

1. A method for displaying an emoji reply, comprising:
   popping up an emoji box on a chat interface upon detecting a first operation performed by a first user on a target chat message on the chat interface, the emoji box including a set of emoji;
   receiving a first emoji selected by the first user from the set of emoji; and
   displaying first emoji reply information on the target chat message, the first emoji reply information comprising the first emoji,
   wherein when a number of users who have replied to the target chat message with the first emoji exceeds a first predetermined threshold, the first emoji reply information further includes a user label for each of a number of users within the first predetermined threshold and first prompt information to represent one or more number of users that exceed the first predetermined threshold, and at least one hidden user label is displayed on the chat interface upon detecting a second operation is performed by a user on the first emoji reply information,
   wherein the method further comprises:
   determining that the first user performs an operation on the target chat message to withdraw the first emoji reply upon detecting that the first user clicks the first user label or an area where the first user label is located.

2. The method of claim 1, wherein when the second operation is performed by the user on the first prompt information, the first emoji, the number of users who have replied to the target chat message with the first emoji, and a user label for each of the number of users who have replied to the target chat message with the first emoji are displayed.

3. The method of claim 1, wherein
   when no other users have replied to the target chat message with the first emoji, the first emoji reply information includes a first user label corresponding to the first user; and
   when a number of users who have replied to the target chat message with the first emoji is at or below a predetermined threshold, the first emoji reply information includes a user label for each of the number of users who have replied to the target chat message with the first emoji.

4. The method of claim 1, further comprising:
   deleting the first user label, or the first user label and the first emoji, on the target chat message upon detecting an operation performed by the first user on the target chat message to withdraw the first emoji reply.

5. The method of claim 1, wherein said displaying the first emoji reply information on the target chat message comprises:
   displaying the first emoji reply information and second emoji reply information on the target chat message, the second emoji reply information comprising a second emoji selected by a second user for replying to the target chat message and a second user label corresponding to the second user, and
   wherein when a number of users who have replied to the target chat message with the second emoji exceeds a second predetermined threshold, the second emoji reply information further comprises a user label for each of a number of users within the second predetermined threshold and second prompt information to represent one or more number of users that exceed the second predetermined threshold.

6. The method of claim 5, wherein when the second operation is performed by the user on the second prompt information, the first emoji, the number of users who have replied to the target chat message with the first emoji, the second emoji, the number of users who have replied to the target chat message with the second emoji, and a user label for each of the number of users who have replied to the target chat message with the second emoji are displayed.

7. The method of claim 1, further comprising:
   when at least one user has replied to the target chat message with an emoji, displaying, in a region where the target chat message is located, a control for adding an emoji.

8. The method of claim 1, further comprising:
   when at least one user has replied to the target chat message with an emoji, displaying, in response to a cursor being in a region where the target chat message is located, a control in the region for adding an emoji.

9. The method of claim 4, wherein deleting the first user label, or the first user label and the first emoji, on the target chat message upon detecting an operation performed by the first user on the target chat message to withdraw the first user from the first emoji reply further comprises:

deleting the first user label and the first emoji on the target chat message, when the first user is the only user who has replied with the first emoji; and deleting the first user label on the target chat message, when there is at least one user, other than the first user, who has replied with the first emoji.

10. The method of claim 1, further comprising:

popping up the emoji box again upon detecting that the first user performs the first operation on the target chat message again;

receiving a second emoji selected by the first user from the set of emoji; and determining that the first user performs an operation on the target chat message to withdraw the first emoji reply when the first emoji is consistent with the second emoji.

11. The method of claim 1, further comprising:

determining a form in which the first emoji reply information is to be displayed on the target chat message based on a number of users who have replied with the first emoji.

12. The method of claim 1, further comprising:

displaying the first emoji reply information in a bubble associated with the target chat message.

13. The method of claim 1, further comprising:

receiving third instruction information for instructing to display second emoji reply information on the target chat message, the second emoji reply information including a second emoji and a second user label corresponding to a second user; and displaying the second emoji reply information on the target chat message in accordance with the third instruction information.

14. The method of claim 13, further comprising, prior to displaying the second emoji reply information on the target chat message in accordance with the third instruction information:

determining whether the first emoji and the second emoji are consistent with each other, wherein displaying the second emoji reply information on the target chat message in accordance with the third instruction information is performed when the first emoji and the second emoji are not consistent with each other.

15. The method of claim 14, further comprising, when the first emoji and the second emoji are consistent with each other:

combining the first emoji reply information and the second emoji reply information, and displaying the combined emoji reply information on the target chat message, the combined emoji reply information including the first emoji, the first user label, and the second user label.

16. The method of claim 1, wherein only a user sending the target chat message is prompted to view the second emoji reply information.

17. An apparatus for displaying an emoji reply, comprising a processor configured to control:

an emoji providing module configured to pop up an emoji box on a chat interface upon detecting a first operation performed by a first user on a target chat message on the chat interface, the emoji box including a set of emoji;

an emoji reply processing module configured to receive a first emoji selected by the first user from the set of emoji, and send an emoji reply request to a server;

a first receiving module configured to receive first instruction information returned by the server in response to the emoji reply request; and an emoji reply displaying module configured to display first emoji reply information on the target chat message in accordance with the first instruction information:

when no other users have replied to the target chat message with the first emoji, the first emoji reply information includes the first emoji and a first user label corresponding to the first user;

when a number of users who have replied to the target chat message with the first emoji is at or below a predetermined threshold, the first emoji reply information includes the first emoji and a user label for each of the number of users who have replied to the target chat message with the first emoji; and when a number of users who have replied to the target chat message with the first emoji exceeds a predetermined threshold, the first emoji reply information includes the first emoji and a user label for each of a number of users within the predetermined threshold and prompt information to represent one or more number of users that exceed the predetermined threshold, and at least one hidden user label is displayed on the chat interface upon detecting a second operation is performed by a user on the prompt information, wherein the emoji reply displaying module is further configured to determine that the first user performs an operation on the target chat message to withdraw the first emoji reply upon detecting that the first user clicks the first user label or an area where the first user label is located.

18. A terminal device, comprising:

at least one processor and a memory communicatively connected to the at least one processor, wherein the memory stores instructions executable by the at least one processor, and the instructions are configured to implement the method for displaying an emoji reply according to claim 1.

19. A non-transitory computer readable storage medium, storing computer instructions configured to cause a computer to implement the method for displaying an emoji reply according to claim 1.

\* \* \* \* \*